Patented Jan. 21, 1947

2,414,722

UNITED STATES PATENT OFFICE 2,414,722

MANUFACTURE OF VITAMIN A

Bishop C. Cornwell, New York, N. Y.

No Drawing. Application October 14, 1943,
Serial No. 506,260

1 Claim. (Cl. 260—611)

1

My invention is directed to an improved process for the synthetical preparation of vitamin A identical with the substance as produced in nature, and has for one of its objects to provide a process for this purpose which is relatively inexpensive in practice.

Another object of my invention is to provide a process for the synthetical production of vitamin A wherein I am able to eliminate the use of intermediates involving high costs, and so to simplify production procedure as to enable me to obtain volume output with the minimum of time and labor.

I have found yields from my improved method to be as high as 20%. The costs involved in producing vitamin A by my improved method under conditions of technical production may be held to approximately one-fourth to one-sixth those which are incurred in the separation and purification of the vitamin from natural sources.

I have discovered that alpha or beta vitamin A may be prepared by reacting alpha or beta ionone and 4-hydroxy-2-methyl-2-butenal or 3,4-, or 2,4-dihydroxy-2-methylbutanal, in which the hydroxyl hydrogen of the fourth carbon has been displaced, with a succinate, or with succinic acid or its anhydride in the presence of a compound giving up no free oxygen in the reaction but causing succinate to form, followed by hydrolysis of the final product. Or, the corresponding ether, or ester of vitamin A may be obtained when the final product is not hydrolyzed.

I have synthesized the intermediate esters, and ethers of 4-hydroxy-2-methyl-2-butenal by (1) oxidation to aldehyde of diethylene glycol, or of mono-esters or mono-ethers of ethylene glycol; (2) aldol condensation of the resulting aldehyde-ether or -ester with propionaldehyde; (3) dehydration of the final product with acid. When dehydration of the final product is not performed, the ester, ether of 3,4- or 2,4-dihydroxy-2-methylbutanal already derived is used; but use of these saturated compounds tends to lower the final yield of vitamin A, because of the formation of unwanted isomers.

The process of producing vitamin A by my

2 improved method is completed according to the following reaction scheme:

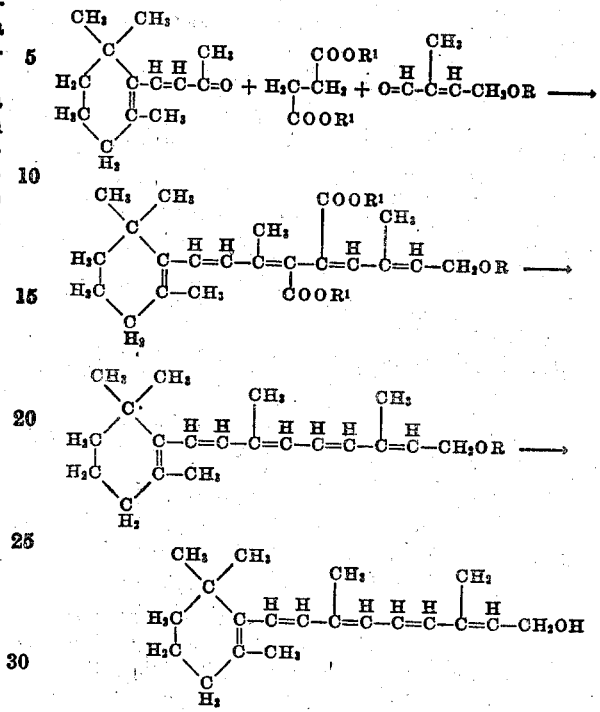

The following are examples of procedures which I have followed in the practice of my invention, and in which I have obtained excellent results:

*Example A*

1.0 gram of the ether of 4-hydroxy-2-methyl-2-butenal (which was prepared from diethylene glycol and propionaldehyde as explained above) is added to 1.5 grams ionone (alpha and/or beta), 1.2 grams succinic acid, 0.5 gram lead monoxide, 1.0 gram acetic anhydride, and 10 ccs. refined petroleum (boiling range 160° C. <).

This mixture is emulsified and stirred continuously while being heated to 115° C.

The mixture is then refluxed until the temperature of the reaction is recorded and maintained at 150° C. for fifteen minutes.

I next cool the reaction mixture, neutralize with ½ N potassium hydroxide solution, and filter the liquid solution.

The insoluble residue is extracted twice with petroleum ether (boiling range 30–40° C.) and the petroleum ether solutions filtered and the resulting filtrates combined with the first filtrate.

The combined filtrates are shaken with a saturated aqueous solution of sodium bisulfite until the petroleum layer gives a negative ketone-aldehyde reaction with p-nitrophenylhydrazine. The petroleum lever then is separated from the aqueous and washed with water.

To 8 ccs. petroleum solution 1 cc. concentrated sulfuric acid is added, and the mixture shaken in the cold until it assumes a deep red violet color. The mixture is then warmed to 45° C. when the color becomes deep violet.

The resultant solution then is neutralized with ½ N potassium hydroxide solution. The petroleum layer is separated, washed with water, and dried over sodium sulfate. With antimony trichloride in chloroform solution, the petroleum solution gives a deep blue coloration.

Spectrophotometric analyses of various samples produced in this manner demonstrate a yield of vitamin A as high as 20%. A completely pure product may be obtained by precipitating the vitamin from petroleum solution with ethyl Cellosolve, followed by elutriation with benzine and petroleum ether (boiling range 70–80° C.). The highest layer always contains the vitamin which is identical in all respects to that obtained from natural sources.

Example B 2.0 grams ethyl succinate are heated to 150° C. To this is added, 1 minim at a time during 30 minutes, a previously prepared mixture of 1.0 gram of the butyl ether of 4-hydroxy-2-methyl-2-butenal, 1.2 grams ionone (alpha and/or beta), and 10 ccs. refined petroleum (boiling range 160° C. <).

The temperature of the reaction is maintained at 150° C. until ten minutes after all liquid has been added.

After cooling the reaction mixture, the same is neutralized with ½ N potassium hydroxide solution.

The mixture is then extracted twice with petroleum ether (boiling range 30–40° C.) and the petroleum ether solution filtered.

The petroleum filtrate is then shaken with a saturated aqueous solution of sodium bisulfite until the petroleum layer gives a negative reaction with p-nitrophenylhydrazine.

The petroleum layer then is separated, washed with water, shaken and warmed with concentrated sulfuric acid, neutralized with ½ N potassium hydroxide solution, washed and dried and finally purified as set out in Example A.

Example C 1.0 gram of the acetate of 4-hydroxy-2-methyl-2-butenal is added to 1.4 grams ionone (alpha and/or beta), 1.3 grams succinic acid, 1.0 gram potassium acetate or other metallic acetate, 0.5 gram lead monoxide and 10 ccs. refined petroleum (boiling range 160° C. <).

The mixture is emulsified, stirred during heating to 115° C., and refluxed from 115° to 150° C. The temperature of the reaction mixture is maintained at 150° C. for fifteen minutes.

The reaction mixture is then cooled, neutralized with ½ N potassium hydroxide solution, and the liquid portion filtered.

The insoluble residue is extracted twice with petroleum ether (boiling range 30–40° C.) and the petroleum ether solution filtered and combined with the first filtrate.

The combined filtrates are shaken with a saturated aqueous solution of sodium bisulfite until the petroleum layer gives a negative reaction with p-nitrophenylhydrazine.

The petroleum layer is separated from the aqueous, washed with water, shaken and warmed with concentrated sulfuric acid, neutralized with ½ N potassium hydroxide solution, washed, dried and finally purified as explained in Example A.

Example D 2.0 grams succinic acid are heated to 150° C., and a mixture of 1.0 gram of the ethyl ether of 4-hydroxy-2-methyl-2-butenal, 1.5 grams ionone (alpha and/or beta), 0.5 gram pyridine and 10 ccs. refined petroleum (boiling range 160° C. <) is added, one minim at a time, while the temperature is maintained at 150° C. When all of this mixture has been added, heating is continued until the acid is completely liquefied in solution and the reaction mixture assumes a deep red-brown color. Heating is continued for three minutes.

The reaction mixture is then cooled, neutralized with ½ N potassium hydroxide solution and the liquid portion filtered.

The insoluble residue is extracted twice with benzine and the benzine solution filtered and combined with the first filtrate.

The combined petroleum solutions are shaken with a saturated aqueous solution of sodium bisulfite until the petroleum layer gives a negative reaction with p-phenylhydrazine.

The petroleum solution is then separated from the aqueous, washed with water, and shaken, 8 ccs. : 1 cc., with concentrated sulfuric acid, until deep red in color. The acid solution is warmed to 45° C. when the color becomes deep violet. It is then cooled, neutralized with ½ N potassium hydroxide solution, washed with water and dried over sodium sulfate.

Ethyl Cellosolve is then added to the petroleum solution, which precipitates the vitamin in the highest layer, from which it may be separated, tested and further purified as may be required.

Example E

In the absence of free oxygen, and under a pressure of 8–12 p. s. i., a mixture of 60% ionone (alpha and/or beta), and 40% diether of 4-hydroxy-2-methyl-2-butenal by weight, and pyridine 5% of total weight, is passed through a tower of dry succinic acid. The temperature of the tower is maintained at 150° C.

An escape line from the peak of this tower is connected to the peak of a second tower containing dry granular unslaked limestone. The temperature of the limestone tower is maintained at 130° C.

An escape line from the base of the limestone tower feeds into a receiving tank which is continuously agitated, and contains a saturated solution of sodium bisulfite in water surmounted by a layer of benzine.

The head of the receiving tank is equipped with a benzine feed line, and an outlet line to permit withdrawal of the vitamin A diether in benzine solution during intervals when agitation of the tank is arrested.

The base of the receiving tank is equipped with intake and outlet lines which allow instillation of bisulfite solution and removal of water and ketone-aldehyde precipitates.

The resulting product is finally hydrolyzed, or left in ethereal form, and purified as set out in Example A.

It is to be understood that other materials may be employed in the practice of my invention in substitution of those mentioned, and that various proportions mentioned may be varied within the purview of my invention.

What I claim is:

The process which comprises condensing (1) an ionone and (2) a member of the group consisting of 4-hydroxy-2-methyl-2-butenal and the ethers and esters of said hydroxy butenal with (3) a member of the group consisting of succinic acid, succinic anhydride and succinates.

BISHOP C. CORNWELL.